United States Patent
Kleinewegen

(10) Patent No.: US 9,689,435 B2
(45) Date of Patent: Jun. 27, 2017

(54) PRESSURE BODY ARRANGEMENT FOR A CLAW COUPLING

(71) Applicant: SIEMENS AKTIENGESELLSCHAFT, München (DE)

(72) Inventor: Stefan Kleinewegen, Bocholt (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/142,787

(22) Filed: Apr. 29, 2016

(65) Prior Publication Data

US 2016/0319885 A1    Nov. 3, 2016

(30) Foreign Application Priority Data

Apr. 30, 2015  (EP) ..................... 15165949

(51) Int. Cl.
*F16D 3/68* (2006.01)
*F16D 3/50* (2006.01)

(52) U.S. Cl.
CPC ....... *F16D 3/50* (2013.01); *F16D 3/68* (2013.01)

(58) Field of Classification Search
CPC ..... F16D 3/50; F16D 3/56; F16D 3/58; F16D 3/64; F16D 3/68; F16D 3/74; F16D 3/78
USPC ...... 464/73–76, 82, 83, 87, 89, 90, 158, 159
See application file for complete search history.

(56) References Cited

U.S. PATENT DOCUMENTS

| 2,706,897 | A  |   | 4/1955  | Holoye |
|-----------|----|---|---------|--------|
| 3,410,112 | A  | * | 11/1968 | Gawreliuk ............... F16D 3/68 464/73 |
| 3,732,706 | A  | * | 5/1973  | Evans ..................... F16D 3/221 464/152 |
| 4,034,575 | A  | * | 7/1977  | Barth ....................... F16D 3/78 464/73 |
| 5,908,355 | A  |   | 6/1999  | Hoyt, III |
| 7,883,423 | B2 | * | 2/2011  | Kubota ..................... F16D 3/68 464/73 |
| 8,602,154 | B2 | * | 12/2013 | Iwasa ....................... F16D 3/68 464/73 |

FOREIGN PATENT DOCUMENTS

| DE | 2841178 A   | * | 3/1980 | ............ F16D 3/50 |
| DE | 29622017 U1 |   | 2/1997 | |
| DE | 29806632 U1 |   | 8/1998 | |
| DE | 19707584 A1 |   | 9/1998 | |
| GB | 691638 A    | * | 5/1953 | ............ F16D 3/68 |

* cited by examiner

*Primary Examiner* — Josh Skroupa
(74) *Attorney, Agent, or Firm* — Henry M. Feiereisen, LLC

(57) ABSTRACT

A pressure body arrangement for a claw coupling includes a pressure body ring made of elastic material. The pressure body ring includes a ring element and pressure bodies which project radially outwards from the ring element. The ring element has an inner circumference which is provided with a circumferential slot-shaped cutout. Inserted in the slot-shaped cutout such as to be releasable non-destructively is a strengthening ring which is made from a material having a strength which is greater that a strength of the elastic material of the pressure body ring.

8 Claims, 2 Drawing Sheets

PRESSURE BODY ARRANGEMENT FOR A CLAW COUPLING

CROSS-REFERENCES TO RELATED APPLICATIONS

This application claims the priority of European Patent Application, Serial No. 15165949.7, filed Apr. 30, 2015, pursuant to 35 U.S.C. 119(a)-(d), the disclosure of which is incorporated herein by reference in its entirety as if fully set forth herein.

BACKGROUND OF THE INVENTION

The present invention relates to a pressure body arrangement for a claw coupling.

The following discussion of related art is provided to assist the reader in understanding the advantages of the invention, and is not to be construed as an admission that this related art is prior art to this invention.

Claw couplings find application to transmit a torque between two shafts aligning with one another, such as between a motor shaft and a transmission shaft for example, and include two coupling elements disposed axially opposite one another, having end face surfaces facing towards one another, from which claws engaging alternately into one another project, and a pressure body arrangement disposed between the coupling elements and made of elastic material. The pressure body arrangement includes a ring element and pressure bodies projecting radially outwards from the ring element, which are each received between a claw of one coupling element and a claw of the other coupling element. During operation, the two coupling elements turn relative to one another in accordance with the torque present and the stiffness of the elastic material of the pressure body ring. Each claw of the coupling elements executes hereby a rotational movement, with a point of a side surface of a claw disposed radially further out moving on a greater circular track than a point of a side surface of a claw disposed radially further inwards and thereby covering a greater distance. This leads to each pressure body of the pressure body ring being pressed together more on the outside than on the inside, which results in an uneven pressure distribution, in which a higher edge pressure acts radially outwards. Accordingly the pressure bodies are pushed radially inwards during the operation of the claw coupling, thereby frequently causing a significant and undesired deformation of the ring element of the pressure body ring.

FIG. 4 shows, by way of example, a deformed pressure body ring 100 after having been dismantled. The pressure body ring 100 is made of elastic material and includes a ring element 101 and eight pressure bodies 102 which project radially outwards from the ring element 101, with the initially circular ring element 101 being heavily deformed.

Attempts have been made to prevent this deformation of the ring element by limiting the maximum permissible torque of a claw coupling. In this way impermissibly high forces directed inwards, acting on the pressure bodies, can be prevented so that deformation of the ring element of the pressure body ring, as shown in FIG. 4, could conceivably be counteracted. However, the maximum permissible torque is to be set very low here, which in many cases is undesired. Another approach involves replacing the ring element 101, shown in FIG. 4, by a circular washer, in order to lend a greater stiffness to the arrangement in the radial direction. A drawback of this approach of configuration of the pressure body arrangement resides in the fact that a shaft can then no longer project into the claw coupling, thereby restricting construction.

It would therefore be desirable and advantageous to provide an improved pressure body arrangement to obviate prior art shortcomings.

SUMMARY OF THE INVENTION

According to one aspect of the present invention, a pressure body arrangement for a claw coupling includes a pressure body ring made of elastic material and including a ring element and pressure bodies which project radially outwards from the ring element, with the ring element having an inner circumference provided with a circumferential slot-shaped cutout, and a strengthening ring inserted in the slot-shaped cutout such as to be releasable non-destructively, with the strengthening ring being made from a material and having a strength which is greater that a strength of the elastic material of the pressure body ring.

Due to the presence to such a strengthening ring, a deformation of the ring element in the radial inwards direction is effectively counteracted, so that claw couplings equipped with a pressure body arrangement according to the invention is able to transmit high torques without causing premature wear of the pressure body arrangement. in addition, a pressure body arrangement according to the invention is still simple in construction and can be manufactured and assembled without problems, despite the provision of an additional strengthening ring. The strengthening ring can also be quickly and easily removed and replaced, if need be.

According to another advantageous feature of the present invention, the strengthening ring can be made of metal. The use of metal is advantageous because of its high strength.

According to another advantageous feature of the present invention, the strengthening ring can be provided with a continuous radial slot. As a result, assembly and disassembly of the strengthening ring is facilitated.

According to another advantageous feature of the present invention, the cutout can have a width which essentially corresponds to a width of the strengthening ring. Thus, the strengthening ring is held in the cutout by a form fit in axial direction. In this way, exact and reproducible positioning of the strengthening ring on the ring element of the pressure body ring is achieved.

According to another aspect of the present invention, a claw coupling includes two coupling elements disposed axially opposite one another having confronting end face surfaces from which claws projects and engage alternately into one another, with the claws disposed on corresponding circular rings, and a pressure body arrangement disposed between the two coupling elements, the pressure body arrangement including a pressure body ring made of elastic material, with the pressure body ring including a ring element, which has an inner circumference provided with a circumferential slot-shaped cutout, and pressure bodies which project radially outwards from the ring element, and a strengthening ring inserted in the slot-shaped cutout such as to be releasable non-destructively, with the strengthening ring being made from a material having a strength which is greater that a strength of the elastic material of the pressure body ring, wherein adjacent claws of the coupling elements define an axially extending receiving area there between which is delimited by facing side surfaces of the claws for receiving a one of the pressure bodies.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
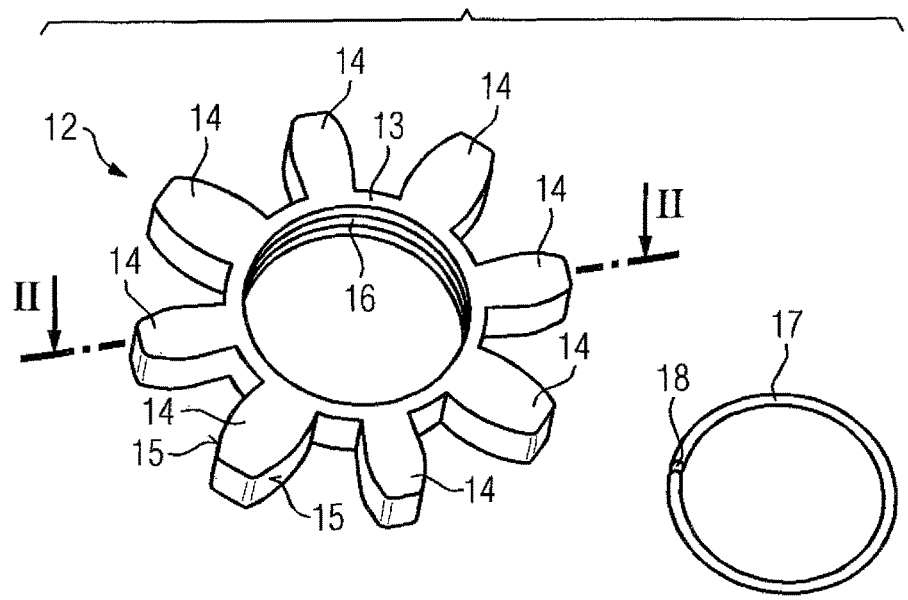
FIG. 1 is a perspective view of one embodiment of a pressure body arrangement according to the present invention in a dismantled state.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
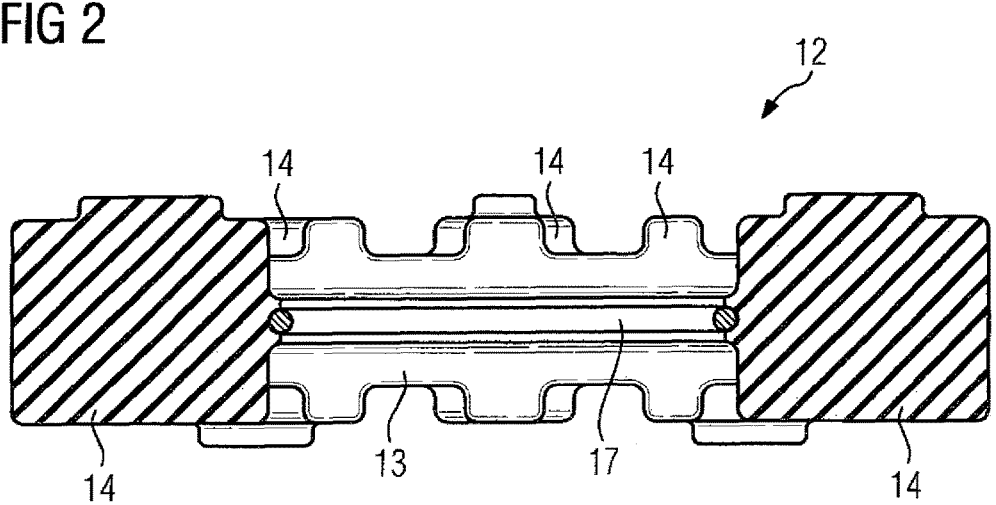
FIG. 2 is a cutaway view of the assembled pressure body arrangement, taken along the line II-II in FIG. 1.
Figure 3:
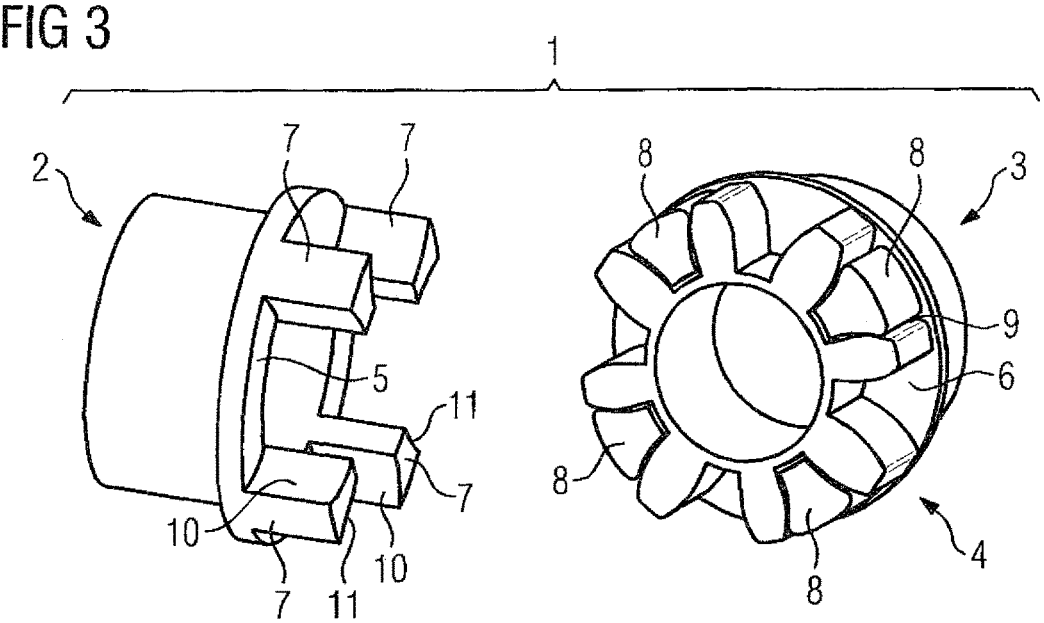
FIG. 3 is a perspective view of a claw coupling, having incorporated therein a pressure body arrangement shown in FIGS. 1 and 2.

Turning now to the drawing, and in particular to FIG. 3, there is shown a perspective view of a claw coupling, generally designated by reference numeral 1. The claw coupling 1 serves to transmit torque between two shafts aligned with one another and includes, when assembled, as main components two coupling elements 2, 3 disposed axially opposite one another with aligning longitudinal axes $A_1, A_2$, and a pressure body arrangement 4 which is disposed between the two coupling elements and shown in greater detail in FIGS. 1 and 2.

The two coupling elements 2, 3 have end face surfaces 5 and 6, respectively, facing towards one another from which claws 7 and 8 engaging alternately into one another project, which are each disposed on corresponding circular rings. Adjacent claws 7, 8 of the coupling elements 2, 3 define a receiving space 9 which extends axially there between and is delimited by concave curved side surfaces 10, 11 of the claws 7, 8 of the coupling elements 2, 3 facing towards one another in the circumferential direction. The coupling elements 2, 3 are embodied identically here. As an alternative, it is, of course, also possible to, optionally, embody the coupling elements 2, 3, as well as their claws 7, 8 differently.

Referring now to FIG. 1, there is shown a perspective view of one embodiment of the pressure body arrangement 4 according to the present invention in a dismantled state. The pressure body arrangement 4 includes a pressure body ring 12 which is made from elastic material and has a ring element 13 as well as eight pressure bodies 14 projecting radially outwards from the ring element 13 The ring element 13 and the pressure bodies 14 are embodied here in one piece. The pressure bodies 14 have surfaces 15 that are curved in a convex shape. Provided on the inner circumference of the ring element 13 is a circumferential slot-shaped cutout 16 for releasable insertion of a strengthening ring 17 in a non-destructive manner. The cutout 16 has a width which essentially corresponds to a width of the strengthening ring 17, so that the strengthening ring 17 is received in the cutout 16 in an axial direction by a form fit. The strengthening ring 17 is provided with a continuous radial slot 18 and is manufactured from a material having a greater strength than the elastic material of the pressure body ring 12. Advantageously, the strengthening ring 17 is made from metal. Although the use of metal is currently preferred because of its high strength, it will be understood that other materials may, of course, also be used for the strengthening ring 17.

In the assembled state of the claw coupling 1, the pressure body arrangement 4 is inserted between the two coupling elements 2, 3 such that the individual pressure bodies 14 of the pressure body ring 12 are received in the respective receiving spaces 9, which are respectively defined between the side surfaces 10, 11 of the claws 7, 8 facing towards each other. The concave curved surfaces of the claws 7, 8 essentially rest hereby on the concave curved surfaces of the pressure bodies 14.

Figure 4:
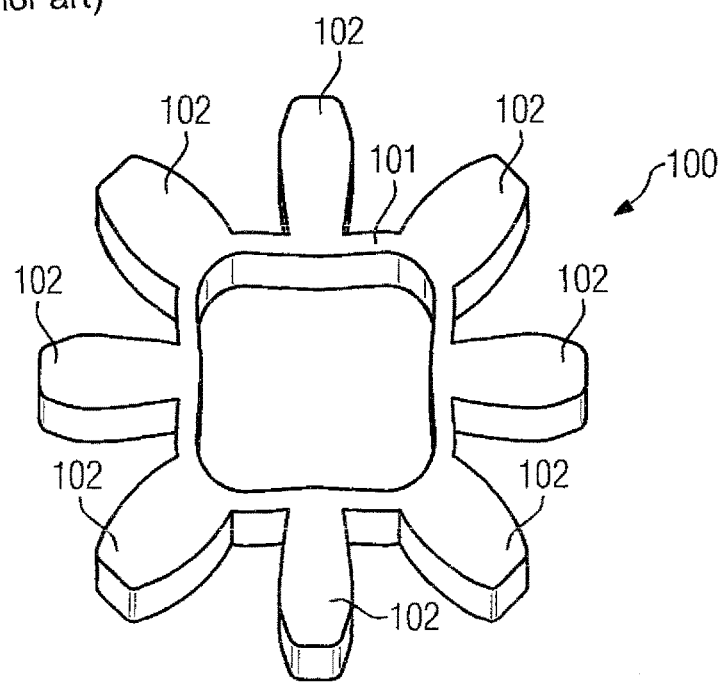
FIG. 4 is a perspective view of a conventional pressure body ring which has been deformed after being dismantled.

An essential advantage of the claw coupling 1 lies in the fact that the strengthening ring 17, which is inserted into the slot-shaped cutout 16 of the ring element 13, counteracts a deformation of the ring element 13 in the radial inwards direction. This leads to comparatively high torques being able to be transmitted with the claw coupling 1, without causing undesired deformation of the pressure body ring 12, as is shown in FIG. 4. In addition, due to its slotted design and its arrangement within the cutout 16 on the ring element 13, the strengthening ring 17 is able to be assembled and dismantled in a simple manner, thereby enabling a replacement of the strengthening ring 17 in the event of wear without problems.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A pressure body arrangement for a claw coupling, comprising:
    a pressure body ring made of elastic material, said pressure body ring including a ring element and pressure bodies which project radially outwards from the ring element, said ring element having an inner circumference provided with a circumferential slot-shaped cutout; and
    a strengthening ring inserted in the slot-shaped cutout such as to be releasable non-destructively, said strengthening ring being made from a material having a strength which is greater than a strength of the elastic material of the pressure body ring.

2. The pressure body arrangement of claim 1, wherein the strengthening ring is made of metal.

3. The pressure body arrangement of claim 1, wherein the strengthening ring has a continuous radial slot.

4. The pressure body arrangement of claim 1, wherein the cutout has a width which essentially corresponds to a width of the strengthening ring.

5. A claw coupling, comprising:
    two coupling elements disposed axially opposite one another having confronting end face surfaces from which claws projects and engage alternately into one another, said claws disposed on corresponding circular rings; and a pressure body arrangement disposed between the two coupling elements, said pressure body arrangement including a pressure body ring made of elastic material, said pressure body ring including a ring element and pressure bodies which project radially outwards from the ring element, said ring element having an inner circumference provided with a circumferential slot-shaped cutout, and a strengthening ring inserted in the slot-shaped cutout such as to be releasable non-destructively, said strengthening ring being made from a material having a strength which is greater that a strength of the elastic material of the pressure body ring, wherein adjacent claws of the coupling elements define an axially extending receiving area there between which is delimited by facing side surfaces of the claws for receiving a one of the pressure bodies.

6. The claw coupling of claim 5, wherein the strengthening ring is made of metal.

7. The claw coupling of claim 5, wherein the strengthening ring has a continuous radial slot.

8. The claw coupling of claim 5, wherein the cutout has a width which essentially corresponds to a width of the strengthening ring.

\* \* \* \* \*